United States Patent
Featherston et al.

(10) Patent No.: US 12,267,249 B1
(45) Date of Patent: Apr. 1, 2025

(54) DIRECTIONAL LINK CREDIT-BASED PACKET TRANSMISSION

(71) Applicant: Marvell Asia Pte Ltd, Singapore (SG)

(72) Inventors: Joseph Featherston, Boston, MA (US); Aadeetya Shreedhar, Natick, MA (US)

(73) Assignee: Marvell Asia Pte Ltd, Singapore (SG)

( * ) Notice: Subject to any disclaimer, the term of this patent is extended or adjusted under 35 U.S.C. 154(b) by 36 days.

(21) Appl. No.: 17/934,017

(22) Filed: Sep. 21, 2022

Related U.S. Application Data (60) Provisional application No. 63/394,072, filed on Aug. 1, 2022.

(51) Int. Cl.
*H04L 47/10* (2022.01)
*H04L 49/25* (2022.01)

(52) U.S. Cl.
CPC .............. *H04L 47/39* (2013.01); *H04L 49/25* (2013.01)

(58) Field of Classification Search
CPC ................................ H04L 47/39; H04L 49/25
See application file for complete search history.

(56) References Cited

U.S. PATENT DOCUMENTS

| | | | |
|---|---|---|---|
| 6,052,375 A | 4/2000 | Bass et al. | |
| 7,143,219 B1 | 11/2006 | Chaudhari et al. | |
| 7,739,436 B2 | 6/2010 | Meyer | |
| 11,507,436 B2 | 11/2022 | Van | |
| 11,929,940 B1 | 3/2024 | Featherston et al. | |
| 2012/0144064 A1* | 6/2012 | Parker | H04Q 11/0005 709/241 |
| 2013/0322459 A1* | 12/2013 | Xu | H04L 49/109 370/412 |
| 2015/0006776 A1 | 1/2015 | Liu et al. | |
| 2017/0063625 A1* | 3/2017 | Philip | H04L 45/302 |

(Continued)

FOREIGN PATENT DOCUMENTS

| | | |
|---|---|---|
| GB | 2605282 A | 9/2022 |
| JP | 06-324958 A | 11/1994 |

OTHER PUBLICATIONS

Lee, et al., "Probabilistic Distance-based Arbitration: Providing Equality of Service for Many-core CMPs," 2010 43rd Annual IEEE/ACM International Symposium on Microarchitecture, pp. 509-519.

(Continued)

*Primary Examiner* — Jung H Park
(74) *Attorney, Agent, or Firm* — Hamilton, Brook, Smith & Reynolds, P.C.

(57) ABSTRACT

A circuit and corresponding method employ directional link (DL) credit pools. The circuit comprises the DL credit pools and transmit (TX) port logic. The DL credit pools are associated with neighboring node (NBN) TX ports of a NBN on a chip. The NBN is coupled to a node on the chip via the circuit. The node includes the circuit. The TX port logic admits a received packet to the circuit based on routing information in the received packet and produces a TX packet by updating the routing information, in the received packet admitted, to indicate a NBN TX port of the NBN TX ports. The TX port logic transmits the TX packet produced to the NBN based on a DL credit pool of the DL credit pools that is associated with the NBN TX port indicated. Use of the DL credit pool mitigates head-of-line blocking under bursty traffic conditions.

40 Claims, 8 Drawing Sheets

(56) References Cited

U.S. PATENT DOCUMENTS

| | | |
|---|---|---|
| 2023/0085669 A1 | 3/2023 | Van Benthem |
| 2023/0102680 A1 | 3/2023 | Kanayama et al. |
| 2024/0048508 A1 | 2/2024 | Viego et al. |

OTHER PUBLICATIONS

Mandal, et al., "Theoretical Analysis and Evaluation of NoCs with Weighted Round-Robin Arbitration," Dept. of ECE, University of Wisconsin-Madison, Aug. 21, 2021.

U.S. Appl. No. 18/328,542 entitled "Single Cycle Request Arbiter," filed Jun. 2, 2023.

Fusella, et al., "Understanding Turn Models for Adaptive Routing: the Modular Approach," Design, Automation and Test in Europe (2018) 1489-1492.

Glass, et al., "The Turn Model for Adaptive Routing," Advanced Computer Systems Laboratory, 1992, 278-287.

Khan, et al., "Design of a Round Robin Arbiter on Resource Sharing," Proceedings of 8th IRF International Conference, May 4, 2014, Pune, India.

Merchant, "The Design and Performance Analysis of an Arbiter for a Multi-Processor Shared-Memory System," Aug. 1984, Laboratory for Information and Decision Systems, Massachusetts Institute of Technology, Cambridge, Massachusetts 02139.

U.S. Appl. No. 17/932,084, entitled "Circuit and Method for Resource Arbitration," filed Sep. 14, 2022.

U.S. Appl. No. 18/154,314, entitled "Mixed-Dimension Order Routing," filed Jan. 13, 2023.

U.S. Appl. No. 18/299,397, entitled "Selective Mesh Routing Through Non-adjacent Nodes," filed Apr. 12, 2023.

U.S. Appl. No. 18/320,713, entitled "Circuit and Method with Weight-Based Arbitration," filed May 19, 2023.

U.S. Appl. No. 18/320,738, entitled "Circuit and Method for Dynamic-Weight Based Arbitration," filed May 19. 2023.

U.S. Appl. No. 18/320,779, entitled "Circuit and Method with Vector-Based Arbitration," filed May 19, 2023.

Wikipedia, "Mesh Interconnect Architecture—Intel," Retrieved from the Internet on Nov. 23, 2022 at https://en.wikipedia.org/wiki/Turn _restriction _routing.

Wikipedia, "Turn restriction routing," Retrieved from the Internet on Nov. 23, 2022 at https://en.wikichip.org/wiki/intel/mesh_interconnect_architecture.

"Next Hop Definition," Created Nov. 17, 2005, Retrieved from the Internet at http://www.linfo.org/next_hop.html on Sep. 15, 2022, the Linux Information Project.

U.S. Appl. No. 18/434,294, entitled "Circuit and Method for Resource Arbitration," filed Feb. 6, 2024.

\* cited by examiner

DIRECTIONAL LINK CREDIT-BASED PACKET TRANSMISSION

RELATED APPLICATION

This application claims the benefit of U.S. Provisional Application No. 63/394,072, filed on Aug. 1, 2022. The entire teachings of the above application are incorporated herein by reference.

BACKGROUND

Multi-core chips enable parallel computing and other functionality within computing devices, such as personal computers, servers, etc., for non-limiting examples. Each core on a multi-core chip can be an independent central processing unit (CPU) that executes program instructions. Dual-, quad-, and even hexa-core processors have been developed for personal computing devices, while high performance server chips have been developed with upwards of ten, twenty, and more cores for non-limiting example. Cores and other on-chip components can be interconnected on a chip via an on-chip interconnect of wire conductors or other transmission media. A variety of interconnect architectures for such an on-chip interconnect have been developed, such as a ring bus interconnect architecture and mesh interconnect architecture for non-limiting examples.

SUMMARY

According to an example embodiment, a circuit comprises directional link (DL) credit pools associated with neighboring node (NBN) transmit (TX) ports of a NBN on a chip. The NBN is coupled to a node on the chip via the circuit. The node includes the circuit. The circuit further comprises TX port logic configured to admit a received packet to the circuit based on routing information in the received packet. The TX port logic is further configured to produce a TX packet by updating the routing information, in the received packet admitted, to indicate a NBN TX port of the NBN TX ports. The TX port logic is further configured to transmit the TX packet to the NBN based on a DL credit pool of the DL credit pools. The DL credit pool is associated with the NBN TX port indicated.

The node may include a switch and the circuit may be a switch TX port of a plurality of switch TX ports of the switch that are configured to transmit to respective neighboring nodes (NBNs).

The circuit may further comprise a DL credit counter corresponding to the DL credit pool. The TX port logic may be further configured to decrement the DL credit counter responsive to transmitting the TX packet produced.

The TX port logic may be further configured to increment the DL credit counter responsive to receiving a DL credit that a) is transmitted from the NBN and b) indicates the NBN TX port associated with the DL credit pool.

The TX port logic may be further configured to transmit the TX packet produced to the NBN based on the DL credit pool including at least one DL credit received from the NBN.

The switch TX port may be coupled to the NBN via a link on the chip. For non-limiting example, the NBN may be located in a cardinal direction relative to the node on the chip and the switch TX port may be associated with the cardinal direction.

The received packet may be received by the switch TX port from a switch receive (RX) port, of a plurality of switch RX ports of the switch, via a broadcast of the received packet by the switch. The received packet may be received by the switch RX port from a) a different NBN on the chip that is different from the NBN and is coupled to the switch RX port, or b) a local component of the node. The local component may be local to the node and coupled to the switch RX port. The local component of the node may be a processor core of the node, a cache of the node, or other local component of the node for non-limiting examples.

The NBN TX port indicated may be a NBN-switch TX port of a plurality of NBN-switch TX ports of a switch of the NBN. The NBN-switch TX port may be coupled to a) another node on the chip that is different from the node and the NBN and coupled to the NBN-switch TX port, or b) a NBN-local component of the NBN. The NBN-local component may be local to the NBN and coupled to the NBN-switch TX port. The NBN-local component may be a processor core of the NBN, a cache of the NBN, or another local component that is local to the NBN for non-limiting examples.

The node and NBN may be nodes of a plurality of nodes arranged in a network topology on the chip. The TX port logic may be further configured to update the routing information based on a routing method, a target identifier (ID) in the received packet, and a source ID in the received packet. The routing method may be based on the network topology.

The received packet may include a target ID and a source ID. The target ID may represent a destination node on the chip for the received packet. The source ID may represent a source node on the chip at which the received packet originated, initially. The plurality of nodes may include the source node and the destination node.

The target ID may further represent a local TX port of the destination node at which to sink the received packet. The local TX port may be local to the destination node. The source ID may further represent a local RX port of the source node. The local RX port may be local to the source node and coupled to a local component of the source node. The local component may be local to the source node and an originator of the received packet, initially.

The network topology may be based on a cartesian coordinate system for non-limiting example. For non-limiting example, the target ID and source ID may represent the destination node and source node via respective x- and y-coordinates associated with the destination node and source node, respectively, in the cartesian coordinate system.

The received packet may further include a payload. The payload may include data sent from the source node to the destination node on the chip.

The circuit may further comprise output buffers. The circuit may be a switch TX port of a plurality of switch TX ports of a switch of the node that are configured to transmit to respective NBNs. The received packet may be received by the switch TX port from a switch receive (RX) port of a plurality of switch RX ports of the switch. The TX port logic may be further configured to queue the TX packet produced in an output buffer of the output buffers. The output buffer may be associated with the switch RX port.

The switch may be configured to broadcast the received packet to the switch TX port and other switch TX ports of the plurality of switch TX ports. The other switch TX ports may be coupled to entities that are different from an entity from which the switch RX port received the received packet. Such an entity may be a NBN or local component coupled to the switch RX port.

Each output buffer of the output buffers may be a first-in first-out (FIFO) for non-limiting example. Each output buffer may be associated with a respective switch RX port of the plurality of switch RX ports. The respective switch RX port may be coupled to a) another node on the chip, different from the NBN, or b) a local component, local to the node.

The circuit may further comprise an arbiter configured to select an output buffer from the output buffers. In an event the TX packet produced is a) queued by the TX port logic in the output buffer selected and b) at a head of the output buffer selected, the TX port logic may be further configured to transmit the TX packet produced and queued, from the output buffer selected, in an event the DL credit pool includes at least one DL credit. The output buffer may be a FIFO for non-limiting example.

The chip may include a mesh interconnect and a plurality of nodes arranged in a mesh network topology for non-limiting example. The plurality of nodes may include the node and the NBN. The TX port logic may be further configured to transmit the TX packet produced to the NBN via a link of the mesh interconnect. The link may be interposed between the node and NBN in the mesh network topology.

According to another example embodiment, a method comprises admitting, at a transmit (TX) port of a node on a chip, a received packet based on routing information in the received packet. The TX port couples the node to a neighboring node (NBN) on the chip. The method further comprises producing a TX packet by updating the routing information, in the received packet admitted, to indicate a NBN TX port of NBN TX ports of the NBN. The method further comprises transmitting the TX packet produced to the NBN based on a directional link (DL) credit pool of DL credit pools. The DL credit pools are associated with the NBN TX ports. The DL credit pool is associated with the NBN TX port indicated.

Further alternative method embodiments parallel those described above in connection with the example circuit embodiment.

According to another example embodiment, an apparatus comprises means for admitting, at a transmit (TX) port of a node on a chip, a received packet based on routing information in the received packet. The TX port couples the node to a neighboring node (NBN) on the chip. The apparatus further comprises means for producing a TX packet by updating the routing information, in the received packet admitted, to indicate a NBN TX port of NBN TX ports of the NBN. The apparatus further comprises means for transmitting the TX packet produced to the NBN based on a directional link (DL) credit pool of DL credit pools. The DL credit pools are associated with the NBN TX ports. The DL credit pool is associated with the NBN TX port indicated.

Further alternative apparatus embodiments parallel those described above in connection with the example circuit embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

A directional link (DL) credit as disclosed herein may represent a token (permission) from a receiver, such as a node, that allows another node, coupled to the node via a link, to send a single packet via the link toward the node for admission to a TX port at the node. The TX port may be indicated by the DL credit via a representation of the TX port.

A next hop as disclosed herein may be an immediate next node/switch to which a packet is sent from a node/switch in a network as the packet traverses nodes/switches of the network on its journey to its final destination node/switch. In an event that the packet is at the final destination node/switch of its journey, the next hop is the final destination node/switch.

In a mesh network on a chip, an interconnect may be employed by packets (flits) to travel between switches from their source to their destination. Each switch may be coupled via the interconnect to neighboring switches, such as in the four cardinal directions, and to one or more local devices, such as processor cores or caches for non-limiting examples. A total number of receive (RX) ports of a switch N that is coupled to the interconnect may be considered the radix of the switch N. At each next hop (switch hop), a packet (flit) may enter through one of these RX ports and may leave through any of the other TX ports of the switch.

To support full link bandwidth from each RX port to any of the possible TX ports, it is useful for each TX port to have a first-in first-out (FIFO) queue sized large enough to store as many flits as the number of cycles in a flit-credit return loop between the transmitting switch and the adjacent, receiving switch/device. The flit-credit return loop may be a number of cycles for a flit (packet), sent from the transmitting switch, to reach a TX port of the adjacent, receiving switch/device and for a credit to then be returned from such TX port to the TX port of the transmitting switch/device that sent the flit. Despite each TX port having a separate receiving FIFO, with such an architecture only one pool of credits may be sent from the RX port to the adjacent, transmitting switch from the previous hop. Because an incoming flit could be destined for any of the TX ports, the number of credits returned will be limited by the occupancy of the most filled output FIFO in all TX ports. This leads to inefficient use of resources, and requires all TX ports to keep a synchronized count of the most filled FIFO.

While a FIFO may be employed at the input (RX) port to limit the size of the FIFOs at the output (TX) ports, such a FIFO adds real estate to the chip and does not solve an issue with head-of-line blocking that may occur at the transmit switch that is sending the packets (flits) that are queued in such a FIFO.

According to an example embodiment disclosed herein, each of the TX ports of a switch may have its own, independent, credit pool that is sent across a link to a switch coupled thereto. A transmitting switch (current hop) that is transmitting packets to such a switch (next hop, receiving switch) may keep a separate count of available credits for each TX port at the next hop, receiving switch. The transmitting switch may determine which TX port a packet (flit) will take at the next hop via a routing method. According to an example embodiment, the transmitting switch may be responsible for checking that it has a credit for the correct transmit port direction before sending the packet. Such a credit may be referred to herein as a directional link (DL) credit that may represent such transmit port direction by representing the transmit port itself, as each transmit port may be configured to transmit in a unique direction according to an example embodiment. The unique direction may be in a cardinal direction outward from the switch or in an internal direction toward a local component that is local to the switch.

Use of such DL credits allows a mesh, or other network on a chip, to have higher peak bandwidth by delaying head-of-line blocking effects under bursty traffic conditions. Because the transmitting switch may have multiple flits (from input ports) ready to be sent at one time, an example embodiment enables a transmitter of a switch to continue to send traffic to the other directions (other transmit ports of a next hop) even when it is out of credits for one direction. In addition, if traffic is spread across all TX ports of a switch, the effective number of credits for each transmitter of the switch is increased from x to (N−1)*x, without any additional buffering necessary. This allows for more links in a system, such as a system-on-a-chip (SoC), to become closer to their ideal maximum bandwidth.

Figure 1:
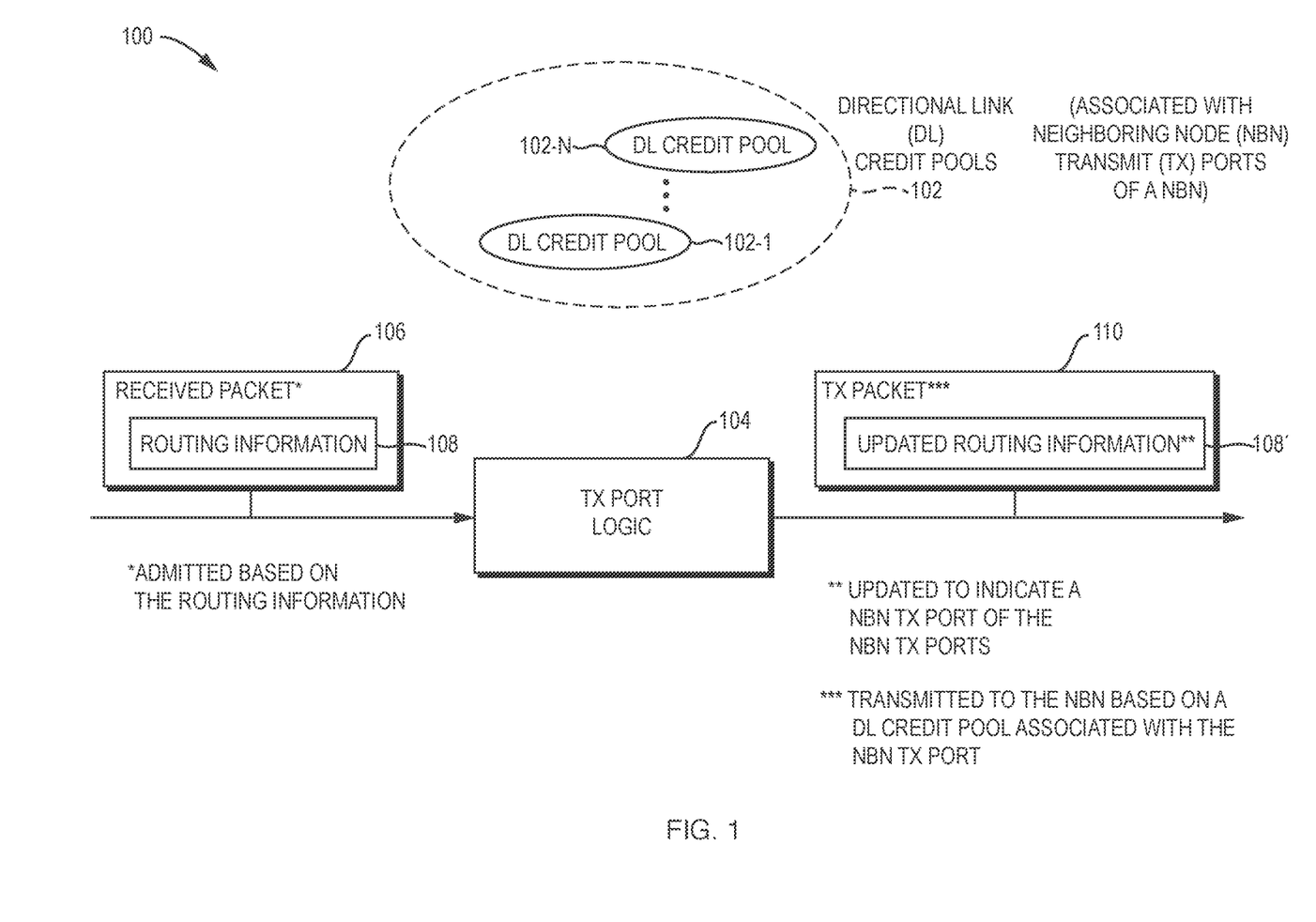
FIG. 1 is a block diagram of an example embodiment of a circuit.

FIG. 1 is a block diagram of an example embodiment of a circuit 100. The circuit comprises directional link (DL) credit pools 102 (e.g., 102-1, . . . 102-N) associated with neighboring node (NBN) transmit (TX) ports (not shown) of a NBN (not shown) on a chip (not shown). The NBN is coupled to a node (not shown) on the chip via the circuit 100. The node includes the circuit 100. The circuit 100 further comprises TX port logic 104 configured to admit a received packet 106 to the circuit 100 based on routing information 108 in the received packet 106. The TX port logic 104 is further configured to produce a TX packet 110 by updating the routing information 108, in the received packet 106 admitted, to indicate a NBN TX port (not shown) of the NBN TX ports. As such, the TX packet 110 produced differs with respect to the received packet 106 as the TX packet 110 has updated routing information 108' indicating the NBN TX port. The NBN represents a next hop for such packet and the NBN TX port represents a TX port from which such packet is to be transmitted at the next hop. The TX port logic 104 is further configured to transmit the TX packet 110 produced to the NBN based on a DL credit pool (102-1, . . . , or 102-N) of the DL credit pools 102. The DL credit pool is associated with the NBN TX port indicated.

The NBN TX port indicated may be a NBN-switch TX port (not shown) of a plurality of NBN-switch TX ports (not shown) of a switch (not shown) of the NBN. The NBN-switch TX port may be coupled to a) another node (not shown) on the chip that is different from the node and the NBN and is coupled to the NBN-switch TX port, or b) a NBN-local component (device) (not shown) of the NBN. The NBN-local component may be local to the NBN and coupled to the NBN-switch TX port. The NBN-local component may be a processor core of the NBN, a cache of the NBN, or another local component that is local to the NBN for non-limiting examples.

The circuit 100 may further comprise a DL credit (token) counter (not shown) corresponding to the DL credit pool (102-1, . . . , or 102-N). The TX port logic 104 may be further configured to decrement the DL credit counter responsive to transmitting the TX packet 110 produced. The TX port logic 104 may be further configured to increment the DL credit counter responsive to receiving a DL credit that a) is transmitted from the NBN and b) indicates the NBN TX port associated with the DL credit pool. A single DL credit may represent permission to transmit a single packet to the NBN TX port. The DL credit may be transmitted from the NBN via a side channel (not shown).

The DL credit may include a plurality of bits associated with the NBN TX ports at the NBN and a DL credit may be received for a NBN TX port based on a respective bit for the NBN TX port being set to a value of one for non-limiting example. The DL credit may have a same format as the routing information 108 and updated routing information 108'. For non-limiting example, if each node has cardinal TX ports and local TX ports, the format may include a bit representing each cardinal TX port and each local TX port. The TX port logic 104 may be further configured to transmit the TX packet 110 produced to the NBN based on the DL credit pool including at least one DL credit received from the NBN. The DL credit pool may include the at least one credit received in an event the DL credit counter corresponding to the DL credit pool has a counter value that is at least one.

The node may include a switch and the circuit 100 may be a switch TX port of a plurality of switch TX ports of the switch that are configured to transmit to respective neighboring nodes (NBNs), in cardinal directions for non-limiting example, as disclosed below with regard to FIG. 2A.

Figure 2A:
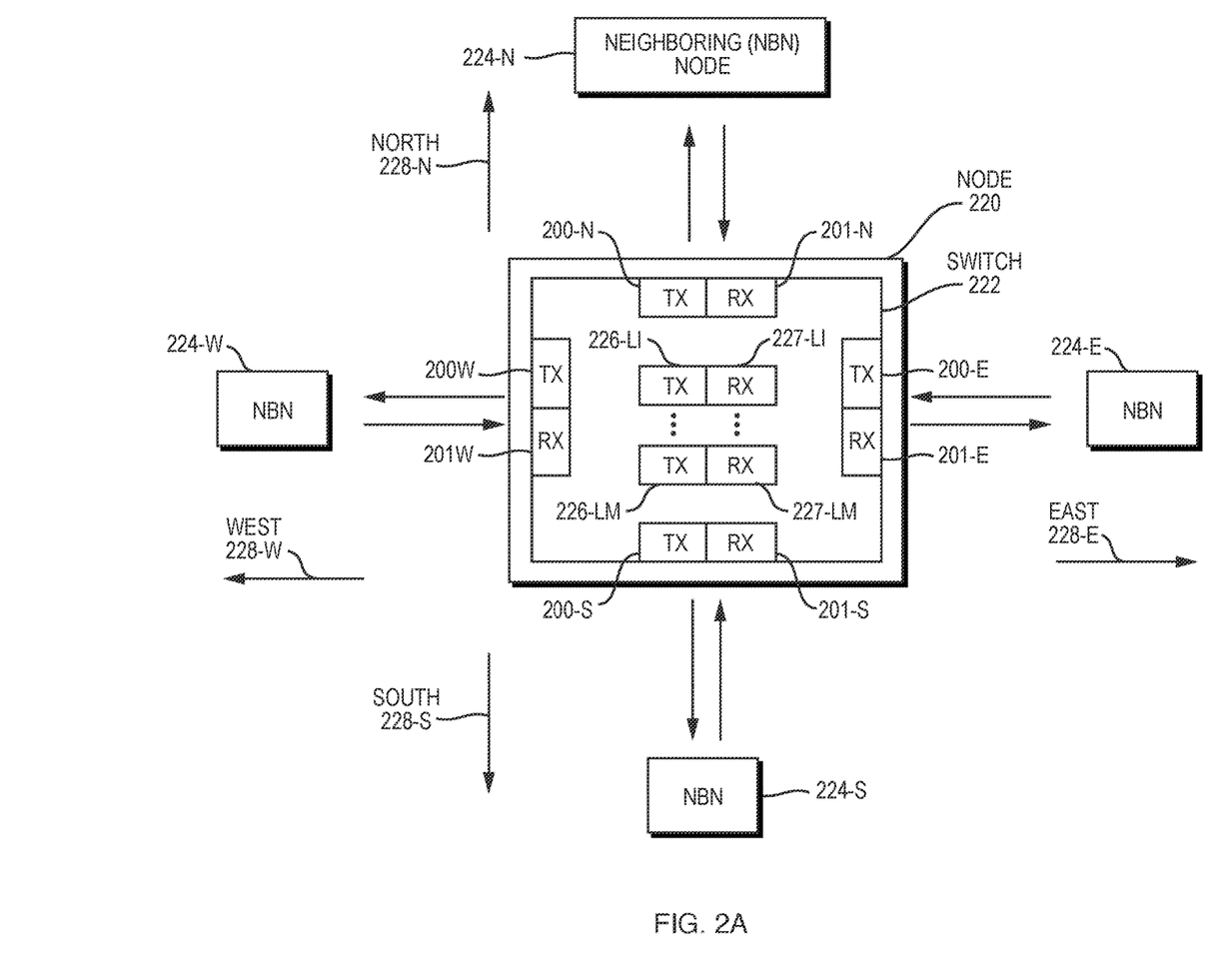
FIG. 2A is a block diagram of an example embodiment of a node.

FIG. 2A is a block diagram of an example embodiment of a node 220. The node 220 includes a switch 222 with a plurality of switch TX ports, namely the switch TX port 200-N, switch TX port 200-S, switch TX port 200E, and switch TX port 200W, that may be configured to transmit to respective neighboring nodes (NBNs), such as the NBN 224-N, NBN 224-S, NBN 224-E, and NBN 224-W, respectively. It should be understood that the node 220 is not limited to four of such switch TX ports, that each of such switch TX ports need not be coupled to a respective NBN, and that such switch TX ports need not be arranged in the manner as shown in FIG. 2A. Such switch TX ports may also be referred to interchangeably herein as switch external-TX (EXT-TX) ports as transmission from same is to an external device (e.g., NBN 224-N, NBN 224-S, NBN 224-E, or NBN 224-W) that is external to the node 220.

The switch 222 further includes a plurality of switch receive (RX) ports, namely the switch RX port 201-N, switch RX port 201-S, switch RX port 201-E, and switch RX port 201-W, that may be configured to receive from respective NBNs, such as the NBN 224-N, NBN 224-S, NBN 224-E, and NBN 224-W, respectively. It should be understood that the node 220 is not limited to four of such switch RX ports, that each of such switch RX ports need not be coupled to a respective NBN, and that such switch RX ports need not be arranged in the manner as shown in FIG. 2A. Such switch RX ports may also be referred to interchangeably herein as switch external-RX (EXT-RX) ports as such ports may receive from an external device (e.g., NBN 224-N, NBN 224-S, NBN 224-E, or NBN 224-W) that is external to the node 220.

In the example embodiment of FIG. 2A, the switch 222 further includes a plurality of local switch-TX ports (226-L1, . . . , 226-LM) that may be referred to simply as local TX ports. Such local TX ports may be configured to transmit to local components (devices) that are local to the switch 222 and local to the node 220. The switch 222 further includes a plurality of local switch-RX ports (227-L1, . . . , 227-LM) that may be referred to simply as local RX ports, that may be configured to receive packets from the local components. Such local components are disclosed below with regard to FIG. 2B.

Figure 2B:
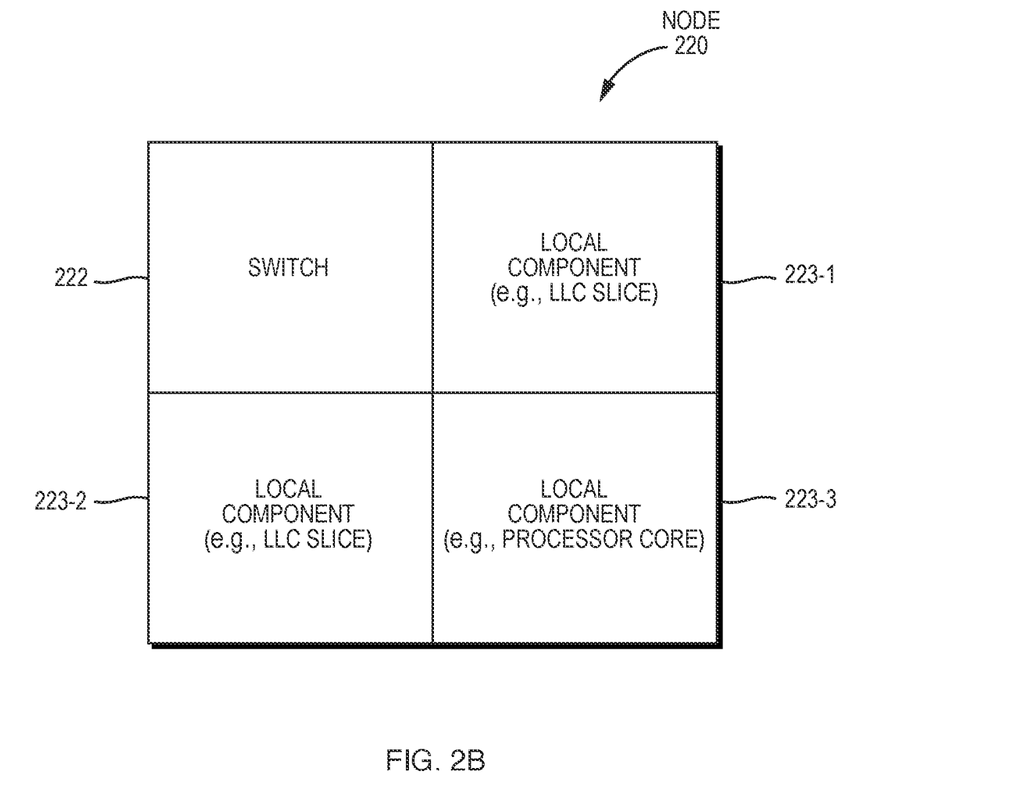
FIG. 2B is a block diagram of an example embodiment of the node of FIG. 2A.

FIG. 2B is a block diagram of an example embodiment of the node 220 of FIG. 2A. In addition to the switch 222, the node 220 includes a first local component 223-1, a second local component 223-2, and a third local component 223-3. It should be understood that the node 220 is not limited to three local components. The first local component 223-1, second local component 223-2, and third local component 223-3 may be a first last level cache (LLC) slice of an LLC (not shown) of the node 220, a second LLC slice of the LLC, and a processor core (not shown) of the node, respectively, for non-limiting examples.

Such local components may be sources for creating packets to be transmitted from the node 220 or sinks that may serve as a final destination for a packet. With reference to FIG. 2A and FIG. 2B, the switch 222 enables packet communications with the local components (223-1, 223-2, 223-3) via respective local switch-RX ports and respective local switch-RX ports of the plurality of local switch-RX ports (227-L1, . . . , 227-LM) and the plurality of local switch-TX ports (226-L1, . . . , 226-LM), respectively.

Continuing with reference to FIG. 2A, a switch TX port (e.g., switch TX port 200-N, switch TX port 200-S, switch TX port 200E, or switch TX port 200W) may be coupled to the respective NBN (e.g., NBN 224-N, NBN 224-S, NBN 224-E, or NBN 224-W) via a respective link (not shown) of a chip (not shown) that includes the node 220. For non-limiting example, such a NBN may be located in a cardinal direction relative to the node 220 on the chip and the switch TX port may be associated with the cardinal direction, such as the north 228-N, south 228-N, east 228-E, and west 228-W directions.

With reference to FIG. 1 and FIG. 2A, the received packet 106 may be received by the switch TX port (e.g., switch TX port 200-N, switch TX port 200-S, switch TX port 200E, or switch TX port 200W) from a switch RX port of the plurality of switch EXT-RX, namely the switch RX port 201-N, switch RX port 201-S, switch RX port 201-E, or switch RX port 201-W, or from a local switch-RX port of the plurality of local switch-RX ports (227-L1, . . . , 227-LM) that may be referred to interchangeably herein simply as local RX ports. Such reception may be via a broadcast of the received packet 106 by the switch 222.

The received packet 106 may be a packet received initially by the node 220 at a switch RX port from a different NBN on the chip that is different from the NBN that is coupled to the switch TX port (i.e., the circuit 100) that is receiving the received packet 106. The different NBN is coupled to such a switch RX port. Alternatively, the received packet 106 may have been created by a local component (device) on the node 220. In such a case, the received packet 106 may be received by the switch TX port (i.e., the circuit 100) from the local component that is sourcing the received packet 106 via a local RX port, such as a local switch-RX port of the plurality of local switch-RX ports (227-L1, . . . , 227-LM). The local component of the node may be a processor core of the node, a cache of the node, or other local component of the node for non-limiting examples.

The node 220 and NBN (e.g., NBN 224-N, NBN 224-S, NBN 224-E, or NBN 224-W) may be nodes of a plurality of nodes arranged in a network topology on the chip, such as disclosed below with regard to FIG. 2C.

Figure 2C:
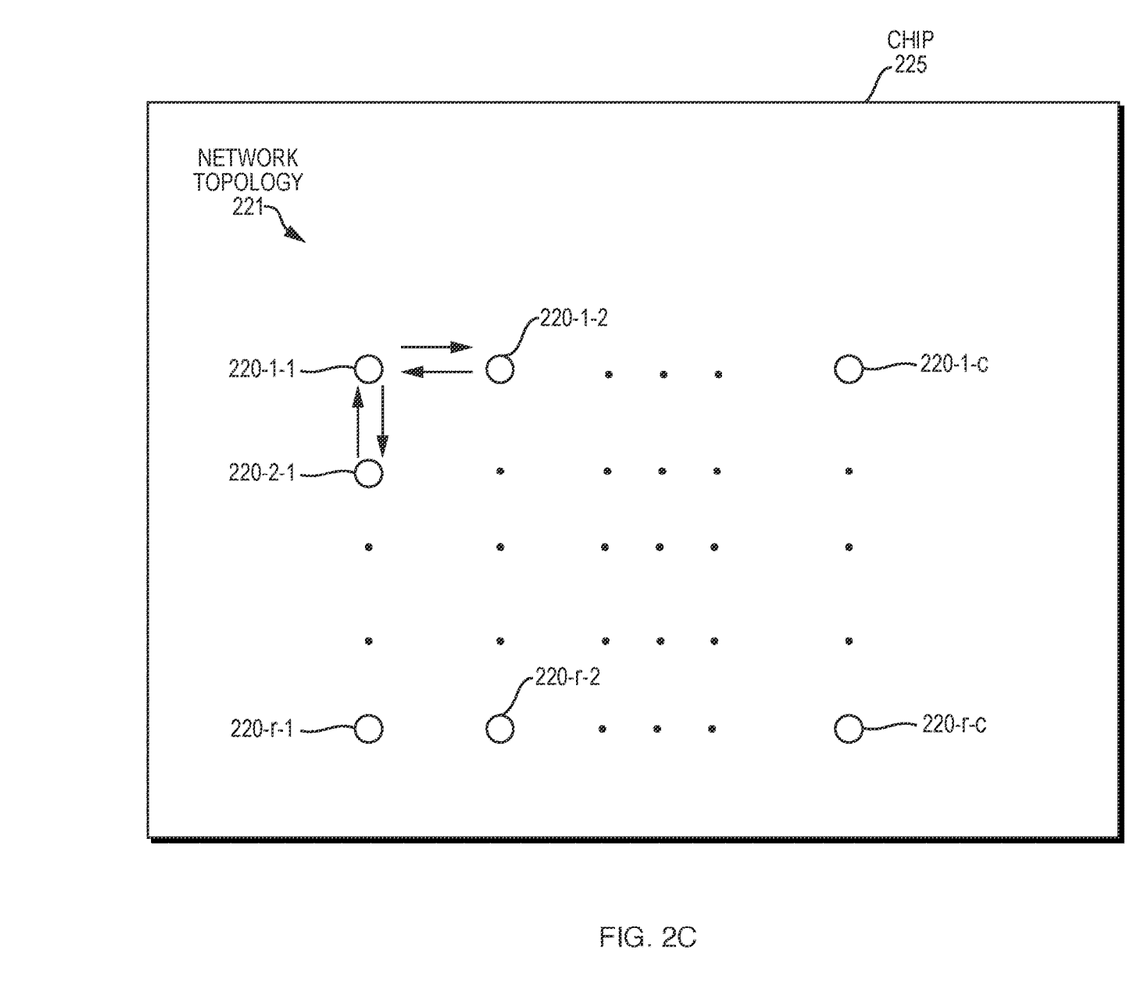
FIG. 2C is a block diagram of an example embodiment of a chip with a plurality of nodes arranged in a network topology.

FIG. 2C is a block diagram of an example embodiment of a chip 225 with a plurality of nodes (220-1-1, . . . 2202-r-c) arranged in a network topology 221 for non-limiting example. In the network topology 221, an interconnect for coupling such nodes is not shown and neighboring nodes (NBNs) are nodes that are adjacent to other nodes for non-limiting example. For example, the node 220-1-1 is a neighboring node (NBN) to the node 220-1-2 and vice versus and the node 220-1-1 is a NBN to the node 220-2-1 and vice-versa. The node 220 of FIGS. 2A and 2B may be employed as a node of the plurality of nodes (220-1-1, . . . 2202-r-c). The chip 225 may include a mesh interconnect (not shown) and the network topology 221 may be a mesh network topology for non-limiting example. The network topology 221 may be considered a grid in the non-limiting example embodiment and it should be understood that another topology may be employed, such as a ring or other topology.

With reference to FIG. 1 and FIG. 2C, the TX port logic 104 may be further configured to update the routing information 108 based on a routing method, a target identifier (ID) (not shown) in the received packet 106 and a source ID (not shown) in the received packet 106. The routing method may be based on the network topology 221 for non-limiting example.

In the network topology 221 the plurality of nodes (220-1-1, . . . 2202-r-c) are arranged in columns (e.g., 1, . . . , c) and rows (e.g., 1, . . . , r) and such network topology may be based on a cartesian coordinate system in which such nodes are assigned x- and y-coordinates. For non-limiting example, the routing method may be a "horizontal first" routing method as is known in the art or other routing method. Based on the horizontal first routing method, the received packet 106 may be routed horizontally from a source node represented via a source ID (e.g., x-y-coordinates) in the received packet 106 until it reaches the column of the destination node (x coordinate matches) represented via a destination ID (e.g., x-y-coordinates) in the received packet 106, at which point the received packet 106 may then be routed vertically to the correct row (y coordinate matches) in which the destination node resides. Once at this destination node, the received packet 106 may be output to the local TX switch port specified in the target ID, disclosed below with regard to FIG. 3.

Figure 3:
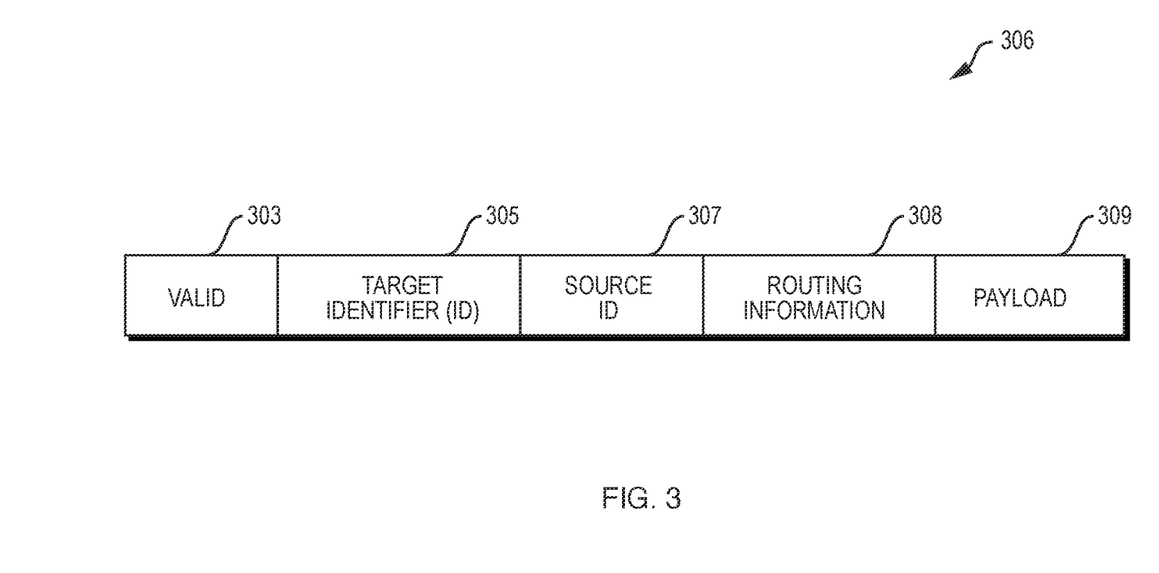
FIG. 3 is a block diagram of an example embodiment of a packet.

FIG. 3 is a block diagram of an example embodiment of a packet 306. The packet 306 may be employed as the received packet 106 of FIG. 1, disclosed above. Continuing with reference to FIG. 3, the packet 306 is split into fields, namely a valid field 303, a target ID field 305, a source ID field 307, a routing information field 308, and a payload field 309. The valid field 303 may be used to indicate whether the packet 306 is valid or not.

The packet 306 may include a target ID and a source ID stored in the target ID field 305 and source ID field 307, respectively. The target ID may represent a destination node (not shown) on a chip (not shown) for the packet 306. With reference to FIG. 2C and FIG. 3, the source ID of the source ID field 307 may represent a source node (not shown) on the chip 225 at which the packet 306 originated, initially. The plurality of nodes (220-1-1, . . . 2202-r-c) may include the source node and the destination node.

With reference to FIG. 2A-C, and FIG. 3, the target ID represented in the target ID field 305 may further represent a local TX port (e.g., 226-1, . . . , or 226-LM) of the destination node coupled to a local component (e.g., 223-1, 223-2, or 223-3) at which to sink the packet 306. The local TX port may be local to the destination node. The source ID may further represent a local RX port (e.g., 227-1, . . . , or 227-LM) coupled to a local component (e.g., 223-1, 223-2, or 223-3) of the source node. The local RX port may be local to the source node and coupled to a local component of the source node. The local component may be local to the source node and an originator of the packet 306, initially.

The network topology 221 may be based on a cartesian coordinate system for non-limiting example. The target ID and source ID represented in the target ID field 305 and source ID field 307, respectively, may represent the destination node and source node via respective x- and y-coordinates associated with the destination node and source node, respectively, in the cartesian coordinate system, for non-limiting examples. The packet 306 may further include a payload in the payload field 309. The payload may include data sent from the source node to the destination node on the chip 225. As described above, the packet 306 may be employed as the received packet 106 of FIG. 1 disclosed above.

With reference back to FIG. 1 and FIG. 2A, the circuit 100 may further comprise output buffers (not shown). The circuit 100 may be a switch TX port of the plurality of switch TX ports (200-N, 200-S, 200E, or 200-W) that are configured to transmit to respective NBNs (224-N, 222-4, 224-E, 224-W). The received packet 106 may be received by the switch TX port from a switch RX port of the plurality of switch EXT-RX ports, namely the switch RX port 201-N, switch RX port 201-S, switch RX port 201-E, or switch RX port 201-W, or from a local switch-RX port of the plurality of local switch-RX ports (227-L1, . . . , 227-LM). The TX port logic 104 may be further configured to queue the TX packet 110 produced in an output buffer of the output buffers. The output buffer may be associated with the switch RX port, as disclosed below with regard to FIG. 4.

Figure 4:
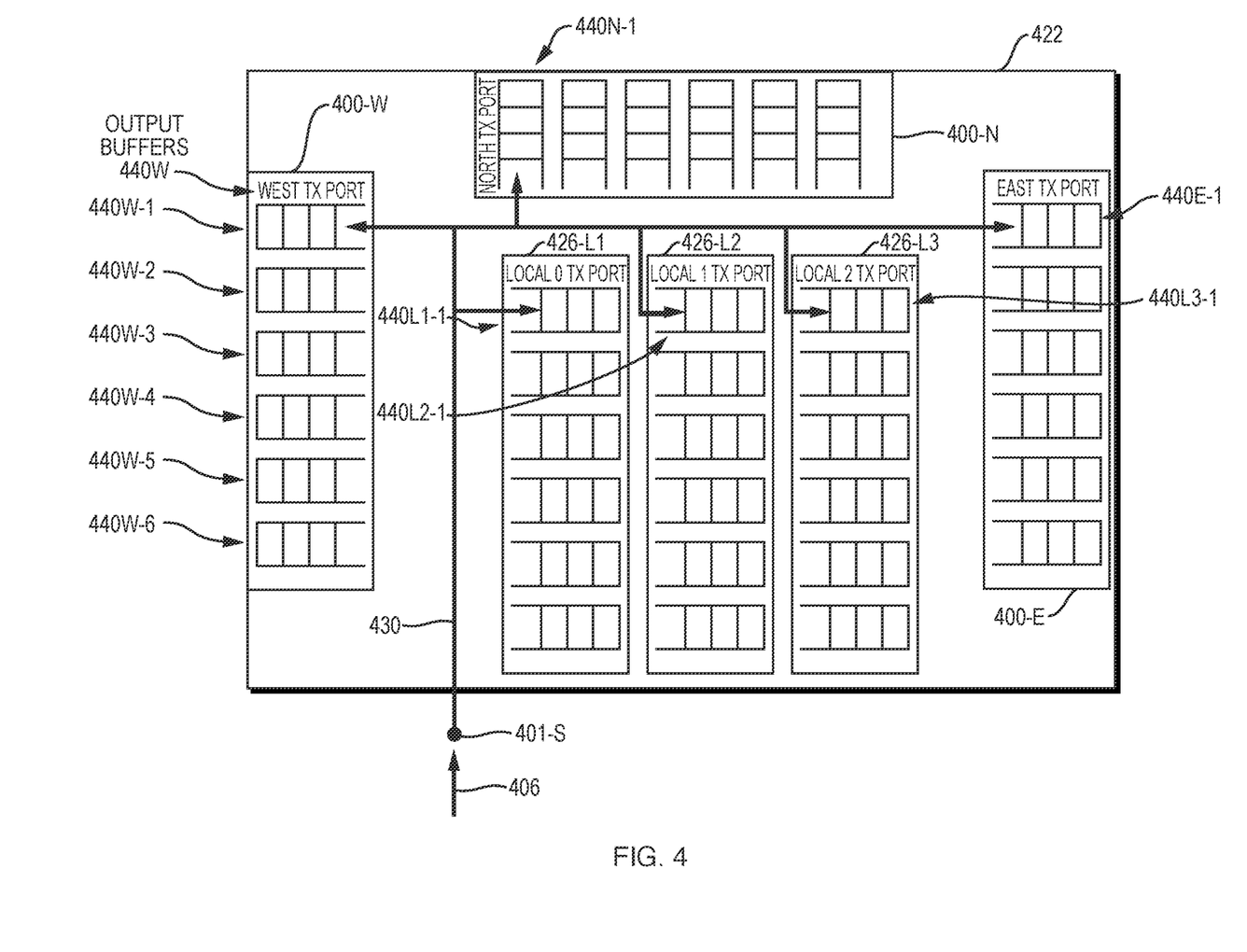
FIG. 4 is a block diagram of an example embodiment of a path through a switch from a south receive (RX) port perspective.

FIG. 4 is a block diagram of an example embodiment of a path 430 through a switch 422 from a south receive (RX) port 401-S perspective. The switch 422 includes a plurality of switch receive RX ports; however, the south RX port 401-S is shown for simplicity as such port is the receiver of the received packet 406 from a neighboring node (NBN) (not shown) coupled to same, in the non-limiting example embodiment of FIG. 4. Further, since the block diagram of FIG. 4 is from the south receive RX port 401-S perspective, the south TX port is not shown.

In the example embodiment of FIG. 4, the switch 422 is configured to broadcast the received packet 406 to the switch TX ports that are coupled to entities that are different from an entity from which the south RX port 401-S received the received packet 406. As such, the switch 222 broadcasts the received packet 406 in a manner that does not loop the received packet 406 back to the entity coupled to the south RX port 401-S. The switch 422 broadcasts the received packet 406 to the north transmit (TX) port 400-N, west TX port 400-W, east TX port 400-E, local 0 Tx port 426-L1, local 1 Tx port 426-L2, and local 2 Tx port 426-L3, as reflected via the path 430 through the switch 422 that is travelled by the received packet 406.

In an event the routing information of the received packet 406 indicates the local 0 TX port 426-L1, local 1 TX port 426-L2, or local 2 TX port 426-L3, the received packet 406 sinks at the respective local component (device) coupled to the local 0 Tx port 426-L1, local 1 Tx port 426-L2, or local 2 TX port 426-L3 indicated.

The north TX port 400-N, west TX port 400-W, and east TX port 400-E may include the circuit 100 of FIG. 1 disclosed above and, thus, may handle the received packet 406 as disclosed above with regard to the received packet 106. With reference to FIG. 1, FIG. 3, and FIG. 4, the routing information 108 may indicate the west TX port 400-W. For example, the routing information field 308 may include a respective bit for each of the north TX port 400-N, south TX port 400-5, west TX port 400-W, east TX port 400-E, local 0 Tx port 426-L1, local 1 Tx port 426-L2, and local 2 TX port 426-L3. The respective bit for the west TX port 400-W may be set while the bits for the other TX ports may be null, for non-limiting example. As such, all of the TX ports except the west TX port 400-W may discard the received packet 406.

At the west TX port 400-W, the TX port logic 104 may admit the received packet 406 to the circuit 100 as the received packet 106 based on the routing information 108 indicating the west TX port 400-W. The TX port logic 104 may produce the TX packet 110 by updating the routing information 108, in the received packet (106, 406) admitted, to indicate a NBN TX port determined via a routing method, as disclosed above. The circuit 100 may include output buffers 440.

Each output buffer (440W-1, . . . , 440W-6) of the output buffers 440 at the west TX port 400-W may be a first-in first-out (FIFO) for non-limiting example. Each output buffer (440W-1, . . . 440W-6) may be associated with a respective switch RX port of the plurality of switch RX ports. The respective switch RX port may be coupled to a) another node on the chip, different from the NBN coupled to the west TX port 400-W, or b) a local component, local to the node. As such the output buffer 440W-1 may be associated with the south RX port 401-S. Similarly, the output buffer 440N-1, output buffer 440E-1, output buffer 440L1-1, output buffer 440L2-1, and output buffer 440L3-1 may each be associated with the south RX port 401-S.

The output buffer 440W-2, output buffer 440W-3, output buffer 440W-4, output buffer 440W-5, and output buffer 440W-6 may be associated with a respective receive port (not shown) at the north, south, or east, or internal (local) to the switch 422. In the example embodiment of FIG. 4, the TX packet produced by updating the routing information in the received packet 406 is queued in the output buffer 440W-1 since such output buffer is associated with the south receive RX port 401-S that received the received packet 406 at the switch 422.

Continuing with reference to FIG. 1 and FIG. 4, the circuit 100 of the west TX port 400-W may further comprise an arbiter (not shown) configured to select an output buffer from the output buffers 440. In an event the arbiter selects the output buffer 440W-1, and the TX packet produced and queued in same is at a head of the output buffer 440W-1, the TX port logic 104 may be further configured to transmit the TX packet produced and queued, from the output buffer 440W-1, in an event there is at least one DL credit in the DL credit pool that is associated with the NBN TX port indicated in the updated routing information of such packet.

Figure 5:
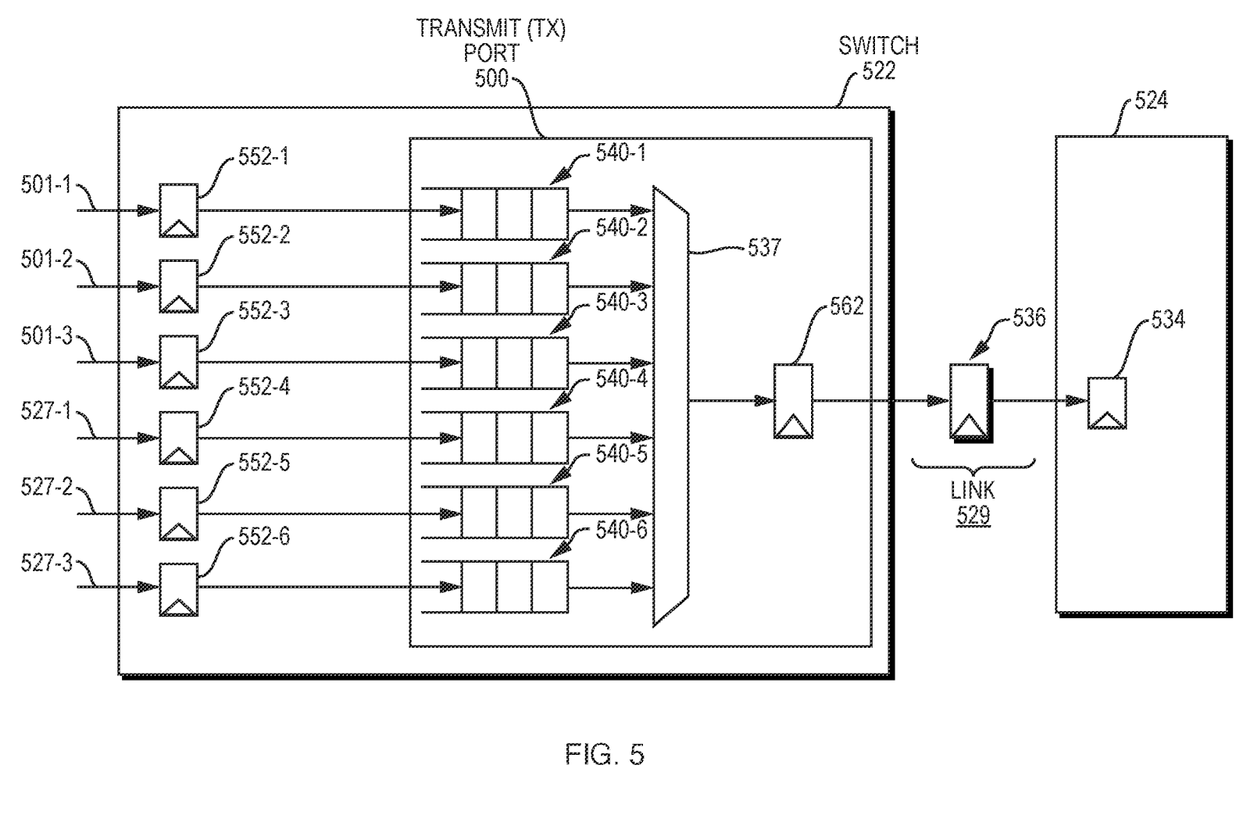
FIG. 5 is a block diagram of an example embodiment of a path through a switch from a transmit (TX) port perspective.

FIG. 5 is a block diagram of an example embodiment of a path through a switch 522 from a transmit (TX) port 500 perspective. With reference to FIG. 1, FIG. 2A, FIG. 4, and FIG. 5, the TX port 500 may include the circuit 100 and may correspond to the switch TX port 200-N, switch TX port 200-S, switch TX port 200-E, or switch TX port 200-W, west TX port 400-W, north TX port 400-N, or east TX port 400-E. Continuing with reference to FIG. 5, the TX port 500 may be referred to interchangeably herein as a switch TX port.

The TX port 500 is coupled to a neighboring node (NBN) (not shown) via a link 529 that is coupled to a NBN switch 524 via an element 534 (e.g., a D flip-flop (FF)) of the NBN switch 524. The link 529 has an associated delay 536.

The switch 522 includes a plurality of D flip-flops (FFs) (552-1, 552-2, 552-3, 552-4, 552-5, 552-6) that may be configured to sample respective packets (not shown) received from a) the switch RX port 501-1, switch RX port 501-2, and switch RX port 501-3 that may be configured to receive packets from respective NBNs and b) the local switch-RX ports (527-1, 527-2, and 527-3) that may be configured to received packets from local sources, such as local components (devices) (not shown) of a node (not shown) that includes the switch 522 and is on a same chip as the NBN switch 524. Such D FFs may be used to selectively admit/deny a received packet based on the routing information of such packet as disclosed above.

The TX port 500 includes respective output buffers (540-1, 540-2, 540-3, 540-4, 540-5, and 540-6) for each source of a packet, namely the switch RX port 501-1, switch RX port 501-2, switch RX port 501-3, and the local switch-RX ports (527-1, 527-2, and 527-3). Packets from such sources have their respective routing information updated by the TX port 500 as disclosed above and are, in turn, queued in the output buffer (540-1, 540-2, 540-3, 540-4, 540-5, or 540-6) associated with the respective source. The transmit port 500 may include an arbiter (not shown) to select an output buffer from the output buffers (540-1, 540-2, 540-3, 540-4, 540-5, and 540-6).

Such selection may be performed via a round-robin arbitration method, as is known in the art, or other arbitration method for non-limiting example, and may employ a multiplexer 537. In an event a packet queued at the head (top) of the output buffer (e.g., FIFO) selected indicates a TX switch port of the NBN switch 524 and a DL credit pool (not shown) associated with such TX switch port is non-empty, the packet may be removed from the output buffer selected and transmitted to the NBN switch 524 via the link 529. Such transmission may not be a direct transmission as there may be logic elements traversed, such as the output D-FF 562. The DL credit pool may be decremented by the transmit port 500 responsive to such transmission.

In an event the DL credit pool associated with the TX switch port of the NBN switch 524 is empty, such packet remains in the output buffer selected, block transmission for such output buffer until the output buffer is selected again and a DL credit for the TX switch port has been received from the NBN switch.

Figure 6:
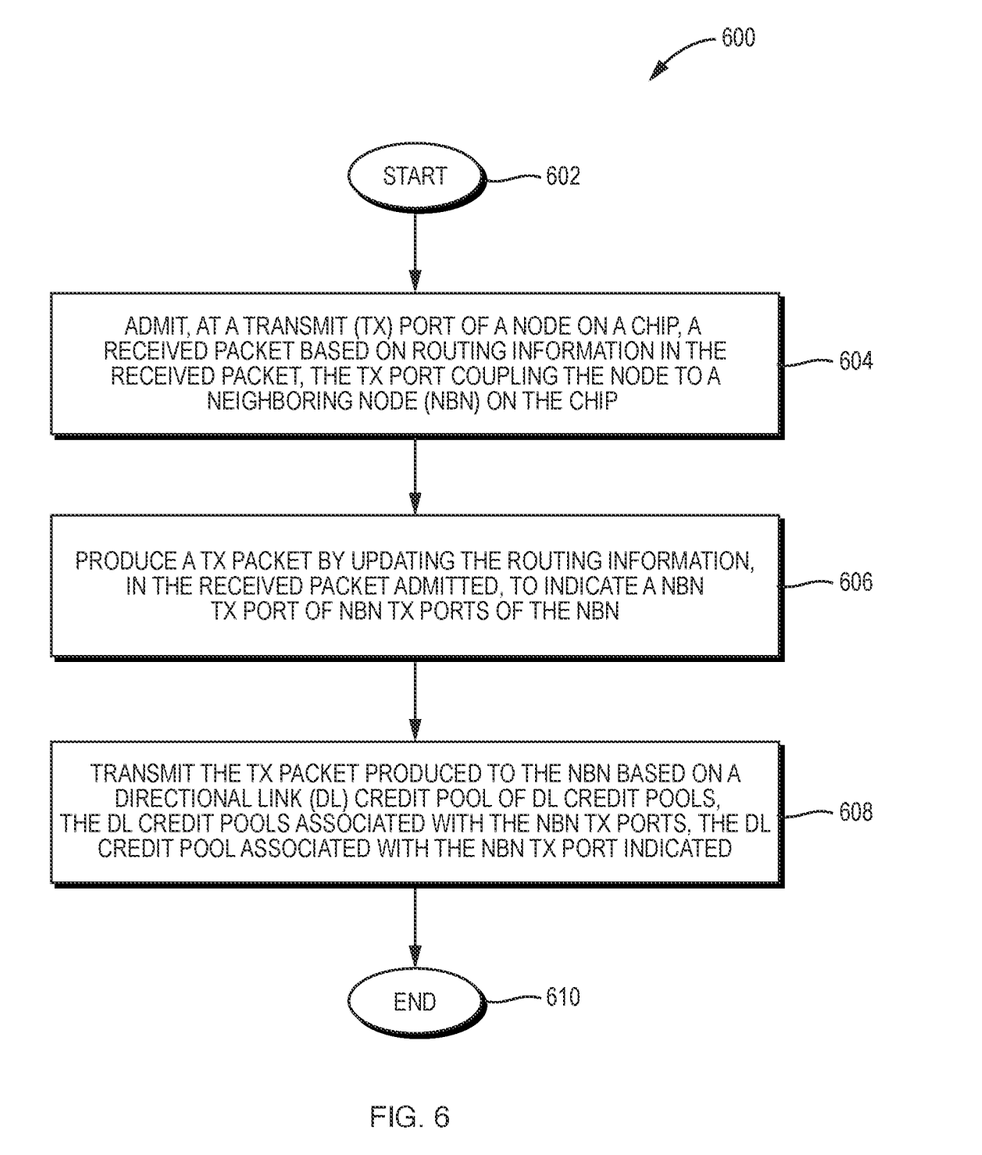
FIG. 6 is a flow diagram of an example embodiment of a method.

FIG. 6 is a flow diagram of an example embodiment of a method. The method begins (602) and comprises admitting, at a transmit (TX) port of a node on a chip, a received packet based on routing information in the received packet (604). The TX port couples the node to a neighboring node (NBN) on the chip. The method further comprises producing a TX packet by updating the routing information, in the received packet admitted, to indicate a NBN TX port of NBN TX ports of the NBN (606). The method further comprises transmitting the TX packet produced to the NBN based on a directional link (DL) credit pool of DL credit pools (608). The DL credit pools are associated with the NBN TX ports. The DL credit pool is associated with the NBN TX port indicated. The method thereafter ends (610), in the example embodiment.

The elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A circuit comprising:
   directional link (DL) credit pools associated with neighboring node (NBN) transmit (TX) ports of a NBN on a chip, the NBN coupled to a node on the chip via the circuit, the node including the circuit, wherein the node and NBN are nodes of a plurality of nodes arranged in a network topology on the chip; and
   TX port logic configured to admit a received packet to the circuit based on routing information in the received packet and to produce a TX packet by updating the routing information, in the received packet admitted, to indicate a NBN TX port of the NBN TX ports, the TX port logic further configured to transmit the TX packet produced to the NBN based on a DL credit pool of the DL credit pools, the DL credit pool associated with the NBN TX port indicated, the received packet including a target identifier (ID) and a source ID, the target ID representing a destination node on the chip for the received packet, the source ID representing a source node on the chip at which the received packet originated, initially, the plurality of nodes including the source node and the destination node.

2. The circuit of claim 1, wherein the node includes a switch and wherein the circuit is a switch TX port of a plurality of switch TX ports of the switch that are configured to transmit to respective neighboring nodes (NBNs).

3. The circuit of claim 1, further comprising a DL credit counter corresponding to the DL credit pool and wherein the TX port logic is further configured to decrement the DL credit counter responsive to transmitting the TX packet produced.

4. The circuit of claim 1, further comprising a DL credit counter corresponding to the DL credit pool and wherein the TX port logic is further configured to increment the DL credit counter responsive to receiving a DL credit a) transmitted from the NBN and b) indicating the NBN TX port associated with the DL credit pool.

5. The circuit of claim 1, wherein the TX port logic is further configured to transmit the TX packet produced to the NBN based on the DL credit pool including at least one DL credit received from the NBN.

6. The circuit of claim 1, wherein the node includes a switch, wherein the circuit is a switch TX port of a plurality of switch TX ports of the switch that are configured to transmit to respective neighboring nodes (NBNs), wherein the switch TX port is coupled to the NBN via a link on the chip, wherein the NBN is located in a cardinal direction relative to the node on the chip, and wherein the switch TX port is associated with the cardinal direction.

7. The circuit of claim 1, wherein the node includes a switch, wherein the circuit is a switch TX port of a plurality of switch TX ports of the switch that are coupled to respective NBNs, wherein the received packet is received by the switch TX port from a switch receive (RX) port, of a plurality of switch RX ports of the switch, via a broadcast of the received packet by the switch, and wherein the received packet is received by the switch RX port from a) a different NBN on the chip, the different NBN different from the NBN and coupled to the switch RX port, or b) a local component of the node, the local component local to the node and coupled to the switch RX port.

8. The circuit of claim 7, wherein the local component is a processor core of the node, a cache of the node, or other local component of the node.

9. The circuit of claim 1, wherein the NBN TX port indicated is a NBN-switch TX port of a plurality of NBN-switch TX ports of a switch of the NBN, wherein the NBN-switch TX port is coupled to a) an other node on the chip, the other node different from the node and the NBN, the other node coupled to the NBN-switch TX port, or b) a NBN-local component of the NBN, the NBN-local component local to the NBN and coupled to the NBN-switch TX port.

10. The circuit of claim 9, wherein the NBN-local component is a processor core of the NBN, a cache of the NBN, or another local component that is local to the NBN.

11. The circuit of claim 1, wherein the TX port logic is further configured to update the routing information based on a routing method, the target ID in the received packet, and the source ID in the received packet, and wherein the routing method is based on the network topology.

12. The circuit of claim 1, wherein the target ID further represents a local TX port of the destination node at which to sink the received packet, the local TX port local to the destination node, and wherein the source ID further represents a local RX port of the source node, the local RX port local to the source node and coupled to a local component of the source node, and wherein the local component is local to the source node and an originator of the received packet, initially.

13. The circuit of claim 1, wherein the network topology is based on a cartesian coordinate system and wherein the target ID and source ID represent the destination node and source node via respective x- and y-coordinates associated with the destination node and source node, respectively, in the cartesian coordinate system.

14. The circuit of claim 1, wherein the received packet further includes a payload and wherein the payload includes data sent from the source node to the destination node on the chip.

15. The circuit of claim 1, wherein the circuit further comprises output buffers, wherein the circuit is a switch TX port of a plurality of switch TX ports of a switch of the node that are configured to transmit to respective neighboring nodes (NBNs), wherein the received packet is received by the switch TX port from a switch receive (RX) port of a plurality of switch RX ports of the switch, and wherein the TX port logic is further configured to queue the TX packet produced in an output buffer of the output buffers, the output buffer associated with the switch RX port.

16. The circuit of claim 15, wherein the switch is configured to broadcast the received packet to the switch TX port and other switch TX ports of the plurality of switch TX ports, the other switch TX ports coupled to entities that are different from an entity from which the switch RX port received the received packet.

17. The circuit of claim 15, wherein each output buffer of the output buffers is a first-in first-out (FIFO) and is associated with a respective switch RX port of the plurality of switch RX ports, the respective switch RX port coupled to a) another node on the chip, different from the NBN, or b) a local component, local to the node.

18. The circuit of claim 1, wherein the circuit further comprises:
output buffers; and
an arbiter configured to select an output buffer from the output buffers, wherein, in an event the TX packet produced is a) queued by the TX port logic in the output buffer selected and b) at a head of the output buffer selected, the TX port logic is further configured to transmit the TX packet produced and queued, from the output buffer selected, in an event the DL credit pool includes at least one DL credit received from the NBN.

19. The circuit of claim 18, wherein the output buffer is FIFO.

20. The circuit of claim 1, wherein the chip includes a mesh interconnect, wherein the network topology is a mesh network topology, wherein the TX port logic is further configured to transmit the TX packet produced to the NBN via a link of the mesh interconnect, and wherein the link is interposed between the node and NBN in the mesh network topology.

21. A method comprising:
admitting, at a transmit (TX) port of a node on a chip, a received packet based on routing information in the received packet, the TX port coupling the node to a neighboring node (NBN) on the chip, wherein the node and NBN are nodes of a plurality of nodes arranged in a network topology on the chip;
producing a TX packet by updating the routing information, in the received packet admitted, to indicate a NBN TX port of NBN TX ports of the NBN; and
transmitting the TX packet produced to the NBN based on a directional link (DL) credit pool of DL credit pools, the DL credit pools associated with the NBN TX ports, the DL credit pool associated with the NBN TX port indicated, the received packet including a target identifier (ID) and a source ID, the target ID representing a destination node on the chip for the received packet, the source ID representing a source node on the chip at which the received packet originated, initially, the plurality of nodes including the source node and the destination node.

22. The method of claim 21, wherein a DL credit counter corresponds to the DL credit pool and wherein the method further comprises decrementing the DL credit counter responsive to transmitting the TX packet produced.

23. The method of claim 21, wherein a DL credit counter corresponds to the DL credit pool and wherein the method further comprises incrementing the DL credit counter responsive to receiving a DL credit a) transmitted from the NBN and b) indicating the NBN TX port associated with the DL credit pool.

24. The method of claim 21, wherein transmitting the TX packet produced to the NBN is based on the DL credit pool including at least one DL credit received from the NBN.

25. The method of claim 21, wherein the NBN is located in a cardinal direction relative to the node on the chip and wherein the transmitting is in the cardinal direction.

26. The method of claim 21, wherein the node includes a switch and wherein the method further comprises receiving the received packet from a switch receive (RX) port, of a plurality of switch RX ports of the switch, via a broadcast of the received packet by the switch, and receiving the received packet by the switch RX port from a) a different NBN on the chip, the different NBN different from the NBN and coupled to the switch RX port, or b) a local component of the node, the local component local to the node and coupled to the switch RX port.

27. The method of claim 26, wherein the local component is a processor core of the node, a cache of the node, or other local component of the node.

28. The method of claim 21, wherein the NBN TX port indicated is a NBN-switch TX port of a plurality of NBN-switch TX ports of a switch of the NBN, wherein the NBN-switch TX port is coupled to a) an other node on the chip, the other node different from the node and the NBN, the other node coupled to the NBN-switch TX port, or b) a NBN-local component of the NBN, the NBN-local component local to the NBN and coupled to the NBN-switch TX port.

29. The method of claim 28, wherein the NBN-local component is a processor core of the NBN, a cache of the NBN, or another local component that is local to the NBN.

30. The method of claim 21, wherein the configuring is based on a routing method, the target ID in the received packet, and the source ID in the received packet, and wherein the routing method is based on the network topology.

31. The method of claim 21, wherein the target ID further represents a local TX port of the destination node at which to sink the received packet, the local TX port local to the destination node, and wherein the source ID further represents a local RX port of the source node, the local RX port local to the source node and coupled to a local component of the source node, and wherein the local component is local to the source node and an originator of the received packet, initially.

32. The method of claim 21, wherein the network topology is based on a cartesian coordinate system and wherein the target ID and source ID represent the destination node and source node via respective x- and y-coordinates associated with the destination node and source node, respectively, in the cartesian coordinate system.

33. The method of claim 21, wherein the received packet further includes a payload and wherein the payload includes data sent from the source node to the destination node on the chip.

34. The method of claim 21, further comprising:
receiving the received packet from a switch receive (RX) port of a plurality of switch RX ports of a switch of the node; and
queuing the TX packet produced in an output buffer of output buffers, the output buffer associated with the switch RX port.

35. The method of claim 34, further comprising broadcasting the received packet to switch TX ports of a plurality of switch TX ports of a switch of the node, the switch TX ports coupled to entities that are different from an entity from which the switch RX port received the received packet.

36. The method of claim 34, wherein each output buffer of the output buffers is a first-in first-out (FIFO) and is associated with a respective switch RX port of the plurality of switch RX ports, the respective switch RX port coupled to a) another node on the chip, different from the NBN, or b) a local component, local to the node.

37. The method of claim 21, further comprising:
queuing the TX packet produced in an output buffer of output buffers; and
selecting, via an arbiter, an output buffer from output buffers, wherein, in an event the TX packet produced is a) queued in the output buffer selected by the arbiter and b) at a head of the output buffer selected by the arbiter, the method further comprises transmitting the TX packet produced, from the output buffer selected by the arbiter, based on the DL credit pool including at least one DL credit from the NBN.

38. The method of claim 37, wherein each output buffer of the output buffers is a FIFO.

39. The method of claim 21, wherein the chip includes a mesh interconnect, wherein the network topology is a mesh network topology, and wherein the method further comprises transmitting the TX packet produced to the NBN via a link of the mesh interconnect, and wherein the link is interposed between the node and NBN in the mesh network topology.

40. An apparatus comprising:
means for admitting, at a transmit (TX) port of a node on a chip, a received packet based on routing information in the received packet, the transmit port coupling the node to a neighboring node (NBN) on the chip, wherein the node and NBN are nodes of a plurality of nodes arranged in a network topology on the chip;
means for producing a TX packet by updating the routing information, in the received packet admitted, to indicate a NBN TX port of NBN TX ports of the NBN; and
means for transmitting the TX packet produced to the NBN based on a directional link (DL) credit pool of DL credit pools, the DL credit pools associated with the NBN TX ports, the DL credit pool associated with the NBN TX port indicated, the received packet including a target identifier (ID) and a source ID, the target ID representing a destination node on the chip for the received packet, the source ID representing a source node on the chip at which the received packet originated, initially, the plurality of nodes including the source node and the destination node.

* * * * *